United States Patent [19]

Kehl

[11] 4,407,730
[45] * Oct. 4, 1983

[54] CATALYTIC SUPPORTS WITH CONTROLLED PORE PROPERTIES

[75] Inventor: William L. Kehl, Pittsburgh, Pa.

[73] Assignee: Gulf Research & Development Co., Pittsburgh, Pa.

[*] Notice: The portion of the term of this patent subsequent to Jul. 1, 1997 has been disclaimed.

[21] Appl. No.: 275,652

[22] Filed: Jun. 22, 1981

[51] Int. Cl.$^3$ ............................................. B01J 27/14
[52] U.S. Cl. .................................................. 502/208
[58] Field of Search ................................ 252/435, 437

[56] References Cited

U.S. PATENT DOCUMENTS

| | | | |
|---|---|---|---|
| 2,440,236 | 4/1948 | Stinton | 252/437 |
| 3,147,227 | 9/1964 | Hansford | 252/437 X |
| 3,211,801 | 10/1965 | Holm et al. | 252/437 |
| 3,502,595 | 3/1970 | Johnson | 252/437 |
| 3,537,816 | 11/1970 | Moscov | 423/328 X |
| 3,544,452 | 12/1970 | Joffe | 252/437 X |
| 3,660,274 | 5/1972 | Blazek et al. | 252/455 Z X |
| 3,697,550 | 10/1972 | Boyne et al. | 252/435 X |
| 4,066,572 | 1/1978 | Chaca | 252/435 X |
| 4,158,621 | 6/1979 | Swift et al. | 252/437 X |
| 4,179,358 | 12/1979 | Swift et al. | 252/437 X |
| 4,228,036 | 10/1980 | Swift et al. | 252/437 |

FOREIGN PATENT DOCUMENTS 917762  2/1963  United Kingdom ............... 252/437

Primary Examiner—Delbert E. Gantz
Assistant Examiner—William G. Wright
Attorney, Agent, or Firm—Deane E. Keith; Forrest D. Stine; Joseph J. Carducci

[57] ABSTRACT

A catalyst support suitable for use in a cracking process or hydrotreating process. The catalyst support comprises a magnesia-alumina-aluminum phosphate matrix which has outstanding thermal stability.

5 Claims, No Drawings

CATALYTIC SUPPORTS WITH CONTROLLED PORE PROPERTIES

BACKGROUND OF THE INVENTION

1. Field of the Invention

The present invention resides in catalytic supports. Particularly, the invention teaches catalytic supports which can be combined with metals suitable for use in either a fluid cracking process or a hydrotreating process.

The catalyst supports herein, when formulated with the requisite metals, are particularly formulated to increase the gasoline yield and quality (i.e., BTX) from gas oils during a cracking process and additionally to catalytically crack petroleum residuals with high selectivity to gasoline production as well as having improved metals tolerance characteristics. Examples of typical metals which can be present during the cracking and/or hydrotreating process include: nickel, vanadium, copper, chromium, iron, cobalt, molybdenum, and inorganic oxides, such as the zeolites, etc.

2. Description of the Prior Art

In my U.S. Pat. No. 4,210,560, dated July 1, 1980, I discovered a catalyst support which can be utilized in a fluid catalyst cracking process or a hydrotreating process, depending upon the type metals formulated with the support, comprising a magnesia-alumina-aluminum phosphate matrix characterized after calcination at 500° C. for 10 hours as amorphous, and having an average pore radius of from about 10 Å to about 300 Å, preferably from about 75 Å to about 200 Å; a surface area ranging from about 100 m²/g to about 350 m²/g, especially from about 125 m²/g to about 250 m²/g; a pore volume of from about 0.3 cc/g to about 1.5 cc/g, preferably from about 0.7 cc/g to about 1.2 cc/g; wherein the magnesia-alumina-aluminum phosphate matrix has a mole percent ratio of from about 10:80:10 to about 25:10:65, especially from about 10:55:35 to about 20:35:45, and wherein said matrix retains at least 90 percent of its surface area when the matrix is additionally calcined at a temperature up to about 750° C. for about 10 hours.

SUMMARY OF THE INVENTION

I have also discovered that catalyst supports similar to those defined and claimed in my U.S. Pat. No. 4,210,560, but wherein the molar ratios of magnesia, alumina and aluminum phosphate are outside the molar ratio ranges defined and claimed in said U.S. Pat. No. 4,210,560, will also have properties similar thereto. Accordingly, the invention defined and claimed herein resides in a catalyst support comprising a magnesia-alumina-aluminum phosphate matrix characterized after calcination at 500° C. for about 10 hours as amorphous, and having an average pore radius of from about 10 Å to about 300 Å, preferably from about 75 Å to about 200 Å; a surface area ranging from about 100 m²/g to about 350 m²/g, especially from about 125 m²/g to about 250 m²/g; a pore volume of from about 0.3 cc/g to about 1.5 cc/g, preferably from about 0.7 cc/g to about 1.2 cc/g; wherein the magnesia-alumina-aluminum phosphate matrix contains magnesia in an amount ranging from at least about 0.5 mole percent but less than about 10 mole percent, preferably about five to about nine mole percent, or in the range above about 25 mole percent to about 75 mole percent, preferably about 30 to about 70 mole percent, alumina in an amount ranging from about two to about 90 mole percent, preferably about 10 to about 80 mole percent and aluminum phosphate in an amount ranging from about three to about 95 mole percent, preferably about 10 to about 80 mole percent, and wherein said matrix retains at least about 90 percent of its surface area when the matrix is additionally calcined at a temperature up to about 750° C. for about 10 hours.

DESCRIPTION OF THE INVENTION

As pointed out above, the present invention resides in catalytic supports. The supports herein can conveniently be used in fluid catalyst cracking processes and hydrotreating processes. One such process is set forth in U.S. Pat. No. 4,179,358, dated Dec. 18, 1979, of Swift et al, the disclosure of which is incorporated herein by reference.

The catalyst support herein is a magnesia-alumina-aluminum phosphate matrix of the formula:

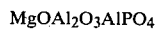

wherein the magnesia is present in an amount ranging from at least about 0.5 mole percent but less than about 10 mole percent, preferably from about five to about nine mole percent, or in the range above about 25 mole percent to about 75 mole percent, preferably about 30 to about 70 mole percent, alumina in an amount ranging from about two to about 90 mole percent, preferably about 10 to about 80 mole percent, and aluminum phosphate in an amount ranging from about three to about 95 mole percent, preferably about 10 to about 80 mole percent.

It is to be noted that the magnesia-alumina-aluminum phosphate matrix herein is characterized after calcination at 500° C. for about 10 hours, as amorphous and having an average pore radius of from about 10 Å to about 300 Å, preferably from about 75 Å to about 200 Å; a surface area ranging from about 100 m²/g to about 350 m²/g, preferably from about 125 m²/g to about 250 m²/g; and a pore volume of from about 0.3 cc/g to about 1.5 cc/g, preferably from about 0.7 cc/g to about 1.2 cc/g; and wherein said matrix retains at least 90 percent of its surface area when the matrix is additionally calcined at a temperature up to about 750° C. for about 10 hours.

The magnesia-alumina-aluminum phosphate catalyst supports herein can be conveniently prepared by admixing together an aqueous solution of aluminum nitrate with an aqueous solution of magnesium nitrate and 85 percent aqueous phosphoric acid. The magnesia-alumina-aluminum phosphate catalyst support can be conveniently precipitated from solution by the addition of ammonium hydroxide. Normally, the solution pH is maintained at or about 9.0, however, the pH can be initially lower than 9.0 and slowly raised to pH 9.0 as the reaction proceeds. It should be noted that the pore size of the catalyst support can be controlled by varying the pH of the solution. In preparing the novel magnesia-alumina-aluminum phosphate support herein magnesium nitrate, aluminum nitrate and phosphoric acid are used in molar amounts stoichiometrically corresponding to the amounts of magnesium, aluminum and phosphate components present in the desired support.

The aluminum nitrate herein can conveniently be prepared by adding nitric acid to aluminum and crystallizing the resultant aluminum nitrate from solutions.

Similarly, magnesium nitrate can be prepared by adding nitric acid to magnesium oxide and crystalizing the resultant magnesium nitrate from solution.

After the magnesia-alumina-aluminum phosphate matrix is filtered from solution it is dried at about 120° C. and calcined at about 500° C. for about 10 hours using conventional apparatus. The matrix was examined after calcination and was found to be amorphous.

It is to be noted that the catalyst supports herein can conveniently be admixed with zeolites to produce cracking catalysts which provide for an improved process for increasing gasoline yield and quality of either light or heavy feedstocks which can additionally contain a high metals content.

Typical zeolites or molecular sieves having cracking activity and which can be suitably dispersed in a matrix for use as a catalytic cracking catalyst are well known in the art. Suitable zeolites are described, for example, in U.S. Pat. No. 3,660,274 to James J. Blazek et al. The description of the crystalline aluminosilicates in the Blazek et al. patent is incorporated herein by reference. Synthetically prepared zeolites are initially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between 6 A and 15 A in diameter. The overall formula for the zeolites can be represented as follows:

$$xM_{2/n}O:Al_2O_3:1.5-6.5SiO_2:yH_2O$$

where M is a metal cation and n its valence and x varies from 0 to 1 and y is a function of the degree of dehydration and varies from 0 to 9, M is preferably a rare earth metal cation such as lanthanum, cerium, praseodymium, neodymium, etc., or mixtures of these.

Zeolites which can be employed in combination with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, E, F, HJ, M, Q, T, W, Z, alpha and beta, ZSM-types and omega. The term "zeolites" as used herein contemplates not only aluminosilicates but substances in which the aluminum is replaced by gallium and substances in which the silicon is replaced by germanium.

The preferred zeolites for use in combination with this invention are the synthetic faujasites of the types Y and X or mixtures thereof; however, the Y-type zeolites are superior when used herein.

It is to be noted that some X-type zeolite will be mixed with the Y-type zeolite due to the difficulty and cost involved in separating the two zeolites. It is additionally noted that the presence of small amounts of the X-type zeolite will not substantially impair the superior selectivity to gasoline production of the catalysts herein.

It is also well known in the art that to obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described in U.S. Pat. No. 3,537,816.

The crystalline aluminosilicate zeolites, such as synthetic faujasite, will under normal conditions, crystalize as regularly shaped, discrete particles of approximately one to ten microns in size, and, accordingly, this is the size range normally used in the commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalysts of this invention.

The term REY-zeolites as defined herein is the Y-type zeolite that has undergone an ion exchange reaction with rare earth metal ions. The naturally occurring molecular sieve zeolites are usually found in the sodium form, an alkaline earth metal form, or mixed forms. The synthetic molecular sieves are normally in their sodium form, however, it should be understood that other alkali metal compounds can be substituted therefor. In their sodium form, the Y zeolites suitable for use herein correspond to the general formula:

$$0.9 \pm 0.2 NaO:Al_2O_3:nSiO_2:xH_2O$$

wherein n is an integer of from about 3 to about 6 and x is an integer of from about 0 to about 9. It is to be noted that after the ion exchange reaction with the rare earth metals, the sodium content of the Y zeolite is from about 0.3 to about 1 molar percent, especially from about 0.5 to about 0.8 molar percent. When sodium is present above this molar range, it tends to deactivate the catalyst and to reduce the sodium content below 0.3 molar percent is too expensive to justify.

Rare earth metals can conveniently be substituted for the sodium in the Y zeolite above using conventional techniques and methods. A wide variety of rare earth compounds can be ion exchanged with the above sodium ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates and the like. The preferred rare earth salts are the chlorides, nitrates and sulfates. It is to be noted that the only limitation on the particular rare earth metal salt or salts employed is that it be sufficiently soluble in the ion exchange fluid medium in which it is used to give the necessary rare earth ion transfer.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chloride. As hereinafter referred to, unless otherwise indicated, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides but having a lower cerium content. It consists of the following rare earths determined as oxides: lanthanum 45-65 percent by weight, cerium 1-2 percent by weight, praseodymium 9-10 percent by weight, neodymium 32-33 percent by weight, samarium 5-7 percent by weight, gadolinium 3-4 percent by weight, yttrium 0.4 percent by weight, and other rare earths 1-2 percent by weight. It is to be understood that other mixtures of rare earths are also applicable for use in combination with the catalytic supports of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

It should be noted that the zeolites when admixed with the catalyst supports herein are normally composited therewith from about 5 to about 50 weight percent, preferably from about 5 to about 35 weight percent based on the weight of said catalyst support.

The matrix or catalyst support herein can additionally be used in combination with metals normally used in a hydrotreating process, for example, in a desulfurization and/or denitrogenation process.

DESCRIPTION OF THE PREFERRED EMBODIMENTS

Example I

A catalyst comprising a magnesia-alumina-aluminum phosphate matrix was prepared according to the following procedure.

A first solution was prepared by dissolving 488 grams of aluminum nitrate in 2 liters of distilled water. A second solution was prepared by dissolving 230 grams of magnesium nitrate in 1 liter of distilled water. The two solutions must be clear. Next, the two solutions were combined and 104 grams of 85 percent phosphoric acid were added and the resulting mixture was agitated for about 5 minutes in a mixing vessel equipped with an electric stirrer. Approximately 2 liters of distilled water was prepared to provide a stirring medium. A stock solution of ammonium hydroxide diluted with distilled water (ratio=1:1) was prepared. The stock solution of ammonium hydroxide and previously mixed solution were slowly added from separate burets to a mixing vessel containing a stirring medium electric stirrer and pH electrodes. The solution pH of the stirring medium was maintained at 9.0 by adjusting the flow rates of the two burets. Vigorous stirring was maintained throughout the mixing period. A white precipitate formed which was recovered from solution by filtration. The filter cake, thus recovered, was washed with 5 liters of distilled water and dried in an electrically heated oven at 120° C. Next the filter cake was calcined in heated air at 500° C. for 10 hours and analyzed by X-ray diffraction which indicated that the product was amorphous. The pore properties of the calcined sample were measured by a standard nitrogen adsorption procedure based on the Brunauer, Emmett & Teller method, as modified by Barrett, E. P., Joyner, L. G. and Halenda, P. P., J.A.C.S., 73, P. 373 (1951). The results are shown in Table 1.

Example II

The procedure of Example I was followed to produce a magnesia-alumina-aluminum phosphate catalyst support with the following exceptions:

The reactants used were 338 grams of aluminum nitrate in 2 liters of distilled water, 358 grams of magnesium nitrate in 2 liters of distilled water and 35 grams of 85 percent phosphoric acid. The calcined sample was measured for pore properties in accordance with the method of Example I and the results are shown in Table 1.

Example III

The procedure of Example I was followed to produce a magnesia-alumina-aluminum phosphate catalyst support with the following exceptions:

The reaction solutions used were 1275 grams of aluminum nitrate in 4 liters of distilled water, 51.2 grams of magnesium nitrate in 1 liter of distilled water and 23 grams of 85 percent phosphoric acid (see Table I).

TABLE I

VARIATION OF PORE CHARACTERISTICS WITH COMPOSITION OF SAMPLES PREPARED AT THE SAME CONSTANT pH
Calcination Temperature: 500° C.

| Example Composition | I<br>$0.45MgO$—$0.1Al_2O_3$—$0.45AlPO_4$ | II<br>$0.7MgO$—$0.15Al_2O_3$—$0.15AlPO_4$ | III<br>$0.08MgO$—$0.67Al_2O_3$—$0.25AlPO_4$ |
|---|---|---|---|
| R.P. (Å) | 199.8 | 154.2 | 40.8 |
| Pore Volume (cc/g) | 0.72 | 0.74 | 0.50 |
| Av. Pore Radium (Å) | 135.3 | 108.8 | 34.0 |
| Surface Area (m$^2$/g) | 105.7 | 135.3 | 292.7 |
| Pore Size Distribution (Vol. Percent) | | | |
| 200-300 Å radius | 50.0 | 30.1 | 1.4 |
| 100-200 | 38.1 | 46.7 | 5.0 |
| 50-100 | 10.4 | 18.1 | 26.3 |
| 30-50 | 1.6 | 5.1 | 38.5 |
| 15-30 | 0 | 0.1 | 28.6 |

TABLE I-continued

VARIATION OF PORE CHARACTERISTICS WITH COMPOSITION OF SAMPLES PREPARED AT THE SAME CONSTANT pH
Calcination Temperature: 500° C.

| Example | I | II | III |
|---|---|---|---|
| Composition | 0.45MgO—0.1Al$_2$O$_3$—0.45AlPO$_4$ | 0.7MgO—0.15Al$_2$O$_3$—0.15AlPO$_4$ | 0.08MgO—0.67Al$_2$O$_3$—0.25AlPO$_4$ |
| <15 | 0 | 0 | 0 |

Example IV

A catalyst support comprising a magnesia-alumina-aluminum phosphate matrix was prepared according to the following procedure.

A first solution was prepared by dissolving 1088 grams of aluminum nitrate in 5 liters of distilled water. A second solution was prepared by dissolving 26 grams of magnesium nitrate in 2 liters of distilled water. The two solutions must be clear. Next, the two solutions were combined and 104 grams of 85 percent phosphoric acid were added and the resulting mixture was agitated for about 5 minutes in a mixing vessel equipped with an electric stirrer. Approximately 2 liters of distilled water was prepared to provide a stirring medium. A stock solution of ammonium hydroxide diluted with distilled water (ratio +1:1) was prepared. The stock solution of ammonium hydroxide and previously mixed solution were slowly added from separate burets to a mixing vessel containing the stirring medium electric stirrer and pH electrodes. The solution pH of the stirring medium was maintained at 9.0 by adjusting the flow rates of the two burets. Vigorous mixing was maintained throughout the mixing period. A white precipitate formed which was recovered from solution by filtration. The filter cake, thus recovered, was washed with 5 liters of distilled water and dried in an electrically heated oven at 120° C. Next the filter cake was calcined in heated air at the indicated temperature (see Table II) for 10 hours. The purpose of this example was to illustrate the thermal stability of this type catalyst support. Pore characteristics of the catalyst support were measured according to the procedure of Example I. The results are shown in Table II.

TABLE II

PORE CHARACTERISTICS AS A FUNCTION OF COMPOSITION AND CALCINATION TEMPERATURE

| Example No. Composition | 0.05MgO—0.50Al$_2$O$_3$—0.45AlPO$_4$ | | |
|---|---|---|---|
| Calcination Temp. (°C.) | 500 | 750 | 900 |
| R.P. (Å) | 183.0 | 174.3 | 170 |
| Pore Volume (cc/g) | 0.83 | 0.6 | 0.53 |
| Av. Pore Radius (Å) | 131.4 | 112.1 | 91.5 |
| Surface Area (m$^2$/g) | 126.5 | 135.8 | 115.2 |
| Pore Size Distribution (Vol. Percent) | | | |
| 200–300 Å radius | 40.7 | 40.9 | 37.2 |
| 100–200 | 44.3 | 40.6 | 40.9 |
| 50–100 | 11.9 | 13.5 | 13.4 |
| 30–50 | 3.0 | 4.1 | 4.5 |
| 15–30 | 0 | 0.9 | 3.9 |
| <15 | 0 | 0 | 0 |

Example V

A representative REY-zeolite catalyst was prepared according to the following procedure:

Into a 4-liter, 3-necked flask equipped with a mechanical stirrer, a water-cooled condenser and thermometer were added 2400 ml. of water to 80° C., with stirring. To the water was added 800 grams of sodium Y zeolite and 564 grams rare earth chloride mixture comprising 48 percent cerium, 24 percent lanthanum, 5 percent praseodymium, 17 percent neodymium, 3 percent samarium, 2 percent gadolinium and 0.8 percent other rare earth compounds. It is to be noted that all percents are by weight. The temperature was maintained at 80° C. for two hours with continued stirring and the reaction mixture was then filtered. The filtered REY-zeolite was reslurried with 2400 ml of water and heated to a temperature of 80° C. Next, an additional 564 grams of the above rare earth chloride mixture was added to the solution. The temperature was maintained at 80° C. for two hours with stirring. The resulting REY-zeolite was filtered and washed with eight 1-liter batches of water.

The REY-zeolite was calcined at 538° C. for 10 hours, slurried with 2400 ml. of water and heated to 80° C. The procedure set forth above for the addition of the rare earth chloride mixture to the Y type zeolite was repeated two additional times and the final reaction product was filtered and washed with eight 1-liter batches of water.

Next, the matrix produced in Example I was slurried and added to the REY-zeolite produced above. The slurry was then spray dried and calcined for 10 hours at 500° C. to produce the desired catalyst. It is to be noted that the REY-zeolite content of the catalyst can be varied according to the wishes of the formulator, however, a weight percent of from about 5 percent to about 35 percent based on the total catalyst weight is desirable, especially 15 weight percent.

Obviously, many modifications and variations of the invention, as hereinabove set forth, can be made without departing from the spirit and scope thereof, and therefore only such limitations should be imposed as are indicated in the appended claims.

I claim:

1. A catalyst support consisting essentially of a magnesia-alumina-aluminum phosphate matrix characterized after calcination at 500° C. for 10 hours as amorphous, and having an average pore radius of from about 10 Å to about 300 Å, a surface area ranging from 100 m$^2$/g to about 350 m$^2$/g, a pore volume of from about 0.3 cc/g to about 1.5 cc/g, wherein the magnesia-alumina-aluminum phosphate matrix contains magnesia in an amount ranging from at least about 0.5 mole percent but less than about 10 mole percent, or in the range above about 25 mole percent to about 75 mole percent, alumina in an amount ranging from about two to about 90 mole percent, and aluminum phosphate in an amount ranging from about three to about 95 mole percent, and wherein said matrix retains at least about 90 percent of its surface area when the matrix is additionally calcined at a temperature up to about 750° C. for about 10 hours.

2. The catalyst support of claim 1 wherein the magnesia is present in a mole percent range of about five to about nine or about 30 to about 70, the alumina in a mole percent range of about 10 to about 80, and the aluminum phosphate in the mole percent range of about 10 to about 80.

3. The catalyst support of claim 1 wherein the average pore radius is in the range of about 75 to about 200 Å.

4. The catalyst support of claim 1 wherein the surface area is in the range of about 125 to about 250 m$^2$/g.

5. The catalyst support of claim 1 wherein the pore volume is in the range of about 0.7 to about 1.2 cc/g.

* * * * *